(12) United States Patent
Islam et al.

(10) Patent No.: US 12,237,742 B2
(45) Date of Patent: Feb. 25, 2025

(54) ELECTRIC MOTOR HAVING HAIRPIN TYPE WINDINGS AND METHOD FOR DESIGNING THE SAME

(71) Applicant: HL MANDO CORPORATION, Gyeonggi-do (KR)

(72) Inventors: Md Sariful Islam, Bay City, MI (US); Mohammad Islam, Bay City, MI (US); Amina Shrestha, Bay City, MI (US); Scott Blehm, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 304 days.

(21) Appl. No.: 18/085,502

(22) Filed: Dec. 20, 2022

(65) Prior Publication Data
US 2024/0204598 A1 Jun. 20, 2024

(51) Int. Cl.
*H02K 3/28* (2006.01)
*H02K 1/24* (2006.01)
(Continued)

(52) U.S. Cl.
CPC ............. *H02K 3/28* (2013.01); *H02K 1/246* (2013.01); *H02K 19/103* (2013.01); *B60T 13/74* (2013.01); *B62D 5/006* (2013.01); *B62D 5/0421* (2013.01)

(58) Field of Classification Search
CPC ........ H02K 1/246; H02K 3/28; H02K 19/103; B60T 13/74; B62D 5/006; B62D 5/0421
(Continued)

(56) References Cited

U.S. PATENT DOCUMENTS

2020/0280230 A1 9/2020 Ong
2021/0408855 A1 12/2021 Islam et al.
(Continued)

FOREIGN PATENT DOCUMENTS

EP 3913773 11/2021
JP 2016-165208 9/2016
(Continued)

OTHER PUBLICATIONS

Office Action dated Jul. 18, 2024 for Korean Patent Application No. 10-2023-0075532 and its English translation from Global Dossier.

*Primary Examiner* — Rashad H Johnson
(74) *Attorney, Agent, or Firm* — WOMBLE BOND DICKINSON (US) LLP

(57) ABSTRACT

A motor comprises: a stator assembly; and a rotor assembly configured to be rotatable relative to the stator assembly, wherein the stator assembly comprises a stator core having stator slots; and electrical conductors at least partially disposed in the stator slots, the electrical conductors having hairpin winding segments, each of the hairpin winding segments comprising: first and second legs, each of the first and second legs having an in-slot portion disposed in one of the stator slots, and an endturn portion formed between the first and second legs. The endturn portion formed between the first and second legs is thicker than the in-slot portion of the first and second legs, disposed in the stator slot. Further, thicknesses of open end portions formed at ends of the first and second legs are different from a thickness of the in-slot portion of the first and second legs, disposed in the stator slot.

20 Claims, 13 Drawing Sheets

(51) Int. Cl.
  *H02K 19/10* (2006.01)
  *B60T 13/74* (2006.01)
  *B62D 5/00* (2006.01)
  *B62D 5/04* (2006.01)

(58) Field of Classification Search
  USPC .................................................. 310/208
  See application file for complete search history.

(56) References Cited

U.S. PATENT DOCUMENTS

| | | | |
|---|---|---|---|
| 2022/0311298 A1* | 9/2022 | Han | H02K 3/28 |
| 2023/0412028 A1* | 12/2023 | Kiba | H02K 3/28 |
| 2024/0006935 A1* | 1/2024 | Blanchard St-Jacques | H02K 3/24 |
| 2024/0113586 A1* | 4/2024 | Simpson | H02K 3/42 |
| 2024/0113606 A1* | 4/2024 | Ruggieri | H02K 15/064 |
| 2024/0213840 A1* | 6/2024 | Morris | H02K 3/28 |
| 2024/0333059 A1* | 10/2024 | Zhang | H02K 1/16 |
| 2024/0339881 A1* | 10/2024 | Bae | H02K 3/28 |

FOREIGN PATENT DOCUMENTS

| | | |
|---|---|---|
| JP | 2017-40350 | 2/2017 |
| JP | 2019-009978 | 1/2019 |
| KR | 10-2013-0028566 | 3/2013 |
| KR | 10-2014-0083730 | 7/2014 |
| KR | 10-2015-0020883 | 2/2015 |
| KR | 10-2015-0031597 | 3/2015 |
| KR | 10-2015-0056368 | 5/2015 |
| KR | 10-2016-0066839 | 6/2016 |
| KR | 10-2018-0117476 | 10/2018 |
| KR | 10-2020-0085122 | 7/2020 |
| KR | 10-2020-0093505 | 8/2020 |
| KR | 10-2022-0044429 | 4/2022 |
| WO | 2020/215154 | 10/2020 |
| WO | 2021/074564 | 4/2021 |
| WO | 2021/095063 | 5/2021 |

* cited by examiner

the open end portions of one of the hairpin winding segments may be coupled to one of the open end portions of another of the hairpin winding segments.

ELECTRIC MOTOR HAVING HAIRPIN TYPE WINDINGS AND METHOD FOR DESIGNING THE SAME

BACKGROUND

Various embodiments of the present disclosure relate in general to an electric motor, and more particularly, to a structure and components of stator and rotor assemblies of an electric motor.

A motor is a well-known electrical machine that converts electrical energy into mechanical energy using magnetic field linkage. Permanent magnet electric motors are known for their high efficiency. The permanent magnet motors are also known for their durability, controllability, and absence of electrical sparking. Due to their advantages the permanent magnet motors are widely used in automobile applications.

However, one of the well-known problems of the permanent magnet motor is torque ripple. Sources of torque ripple in the permanent magnet motors include inherent harmonics in the flux linkage, and cogging. Cogging may be a term used to describe the torque of the permanent magnet motor disconnected from the power source. Presence of harmonics in the flux linkage results in instantaneous torque that pulsates as a function of the rotor position. Torque ripple may be generally undesirable in many permanent magnet motors applications, particularly at low speed.

High energy density permanent magnets may crucial to the design of permanent magnet motors for vehicles. Current motor designs may use rare earth materials which easily meet the performance goals. However, there are the rising concerns over cost and unstable supply of rare earth resources.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiment of the present disclosure, a motor may comprise: a stator assembly; and a rotor assembly configured to be rotatable relative to the stator assembly, wherein the stator assembly comprises: a stator core having stator slots; and electrical conductors at least partially disposed in the stator slots, the electrical conductors having a plurality of hairpin winding segments, each of the hairpin winding segments comprising: first and second legs, each of the first and second legs having an in-slot portion disposed in one of the stator slots, and an endturn portion formed between the first and second legs.

The endturn portion formed between the first and second legs of each of the hairpin winding segments may be thicker than the in-slot portion of the first and second legs of each of the hairpin winding segments, disposed in one of the stator slots.

Each of the hairpin winding segments may further comprise open end portions formed at ends of the first and second legs, and the open end portions formed at the ends of the first and second legs of each of the hairpin winding segments may be thicker than the in-slot portion of the first and second legs of each of the hairpin winding segments, disposed in one of the stator slots.

The endturn portion formed between the first and second legs of each of the hairpin winding segments may be exposed to an outside of the stator core, and the in-slot portion of the first and second legs of each of the hairpin winding segments may be disposed inside one of the stator slots of the stator core.

One of the open end portions of one of the hairpin winding segments may be coupled to one of the open end portions of another of the hairpin winding segments.

The open end portions of each of the hairpin winding segments may be bent away from each other so that one of the open end portions of one of the hairpin winding segments can be coupled to one of the open end portions of another of the hairpin winding segments.

According to a first exemplary embodiment of the present disclosure, the electrical conductors may be configured for dual multi-phase. In a first example, first hairpin winding segments inserted in one of two adjacently positioned stator slots and second hairpin winding segments inserted in another of the two adjacently positioned stator slots are connected to first and second inverters, respectively. In a second example, first hairpin winding segments inserted in a half of the stator slots, consecutively positioned, and second hairpin winding segments inserted in another half of the stator slots, consecutively positioned, are connected to first and second inverters, respectively.

According to a second exemplary embodiment of the present disclosure, the electrical conductors may be configured for single multi-phase. For example, first hairpin winding segments inserted in one of two adjacently positioned stator slots and second hairpin winding segments inserted in another of the two adjacently positioned stator slots are connected in series to each other.

The stator slots may be formed in parallel to each other.

The rotor assembly may comprise: one or more first reluctance rotor segments comprising a plurality of flux barriers including permanent magnets; and one or more second reluctance rotor segments comprising a plurality of flux barriers having no magnet.

The one or more first reluctance rotor segments and the one or more second reluctance rotor segments may be axially stacked relative to each other or alternately.

The permanent magnets included in the flux barriers of the one or more first reluctance rotor segments may comprise ferrite magnets.

The one or more first and second reluctance rotor segments may not include a rare earth material.

According to certain embodiments of the present disclosure, a motor may comprise: a stator assembly; and a rotor assembly configured to be rotatable relative to the stator assembly, wherein the stator assembly comprises: a stator core having stator slots; and electrical conductors at least partially disposed in the stator slots, the electrical conductors having a plurality of hairpin winding segments, each of the hairpin winding segments comprising: first and second legs, each of the first and second legs having an in-slot portion disposed in one of the stator slots, and an endturn portion formed between the first and second legs, wherein a thickness of the endturn portion formed between the first and second legs of each of the hairpin winding segments is different from a thickness of the in-slot portion of the first and second legs of each of the hairpin winding segments, disposed in one of the stator slots.

The motor further comprises a plurality of jumper connections, each of the jumper connections connecting between two or more of the hairpin winding segments.

Each of the jumper connections is coupled to end portions of the two or more of the hairpin winding segments.

Each of the jumper connections has: radial connection lines extending in a radial direction of the stator core and coupled to the two or more of the hairpin winding segments, and a circumferential connection line extending in a circumferential direction of the stator core and connecting between the radial connection lines.

The circumferential connection line of each of the jumper connections is disposed adjacent to an outer edge of the stator core or outside an assembly of the conductors. And, the circumferential connection line of each of the jumper connections is disposed adjacent to an inner edge of the stator core or inside an assembly of the conductors.

The endturn portion formed between the first and second legs of each of the hairpin winding segments is thicker than the in-slot portion of the first and second legs of each of the hairpin winding segments, disposed in one of the stator slots. Alternatively, the endturn portion formed between the first and second legs of each of the hairpin winding segments is thinner than the in-slot portion of the first and second legs of each of the hairpin winding segments, disposed in one of the stator slots.

Each of the hairpin winding segments further comprises open end portions formed at ends of the first and second legs, and thicknesses of the open end portions formed at the ends of the first and second legs of each of the hairpin winding segments are different from the thickness of the in-slot portion of the first and second legs of each of the hairpin winding segments, disposed in one of the stator slots.

The open end portions formed at the ends of the first and second legs of each of the hairpin winding segments are thicker than the in-slot portion of the first and second legs of each of the hairpin winding segments, disposed in one of the stator slots. Alternatively, the open end portions formed at the ends of the first and second legs of each of the hairpin winding segments are thinner than the in-slot portion of the first and second legs of each of the hairpin winding segments, disposed in one of the stator slots.

The endturn portion formed between the first and second legs of each of the hairpin winding segments is exposed to an outside of the stator core, and the in-slot portion of the first and second legs of each of the hairpin winding segments is disposed inside one of the stator slots of the stator core.

First hairpin winding segments inserted in one of two adjacently positioned stator slots and second hairpin winding segments inserted in another of the two adjacently positioned stator slots are connected to first and second inverters, respectively.

First hairpin winding segments inserted in a half of the stator slots, consecutively positioned, and second hairpin winding segments inserted in another half of the stator slots, consecutively positioned, are connected to first and second inverters, respectively.

First hairpin winding segments inserted in one of two adjacently positioned stator slots and second hairpin winding segments inserted in another of the two adjacently positioned stator slots are connected in series to each other.

The electrical conductors are configured for dual multi-phase, wherein first hairpin winding segments inserted in one of two adjacently positioned stator slots and second hairpin winding segments inserted in another of the two adjacently positioned stator slots are connected to first and second inverters, respectively.

The electrical conductors are configured for dual multi-phase, wherein first hairpin winding segments inserted in a half of the stator slots, consecutively positioned, and second hairpin winding segments inserted in another half of the stator slots, consecutively positioned, are connected to first and second inverters, respectively.

The electrical conductors are configured for single multi-phase, wherein first hairpin winding segments inserted in one of two adjacently positioned stator slots and second hairpin winding segments inserted in another of the two adjacently positioned stator slots are connected in series to each other.

The rotor assembly comprises: one or more first reluctance rotor segments comprising a plurality of flux barriers including permanent magnets, wherein the permanent magnets included in the flux barriers of the one or more first reluctance rotor segments comprise ferrite magnets; and one or more second reluctance rotor segments comprising a plurality of flux barriers having no magnet, and the one or more first and second reluctance rotor segments do not include a rare earth material.

According to some embodiments of the present disclosure, a vehicle may comprise: one or more road wheels configured to cause the vehicle to move; a steering wheel configured to generate an input for controlling the one or more road wheels; a brake assembly configured to operate a vehicle brake associated with the one or more road wheels; and one or more motors operatively connected to one or more of the one or more road wheels, the steering wheel and the brake assembly, at least one of the motors comprising: a stator assembly, and a rotor assembly configured to be rotatable relative to the stator assembly, wherein the stator assembly comprises a stator core having stator slots, and electrical conductors at least partially disposed in the stator slots, the electrical conductors having a plurality of hairpin winding segments, each of the hairpin winding segments comprising first and second legs, each of the first and second legs having an in-slot portion disposed in one of the stator slots, and an endturn portion formed between the first and second legs, and wherein a thickness of the endturn portion formed between the first and second legs of each of the hairpin winding segments is different from a thickness of the in-slot portion of the first and second legs of each of the hairpin winding segments, disposed in one of the stator slots.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1A:
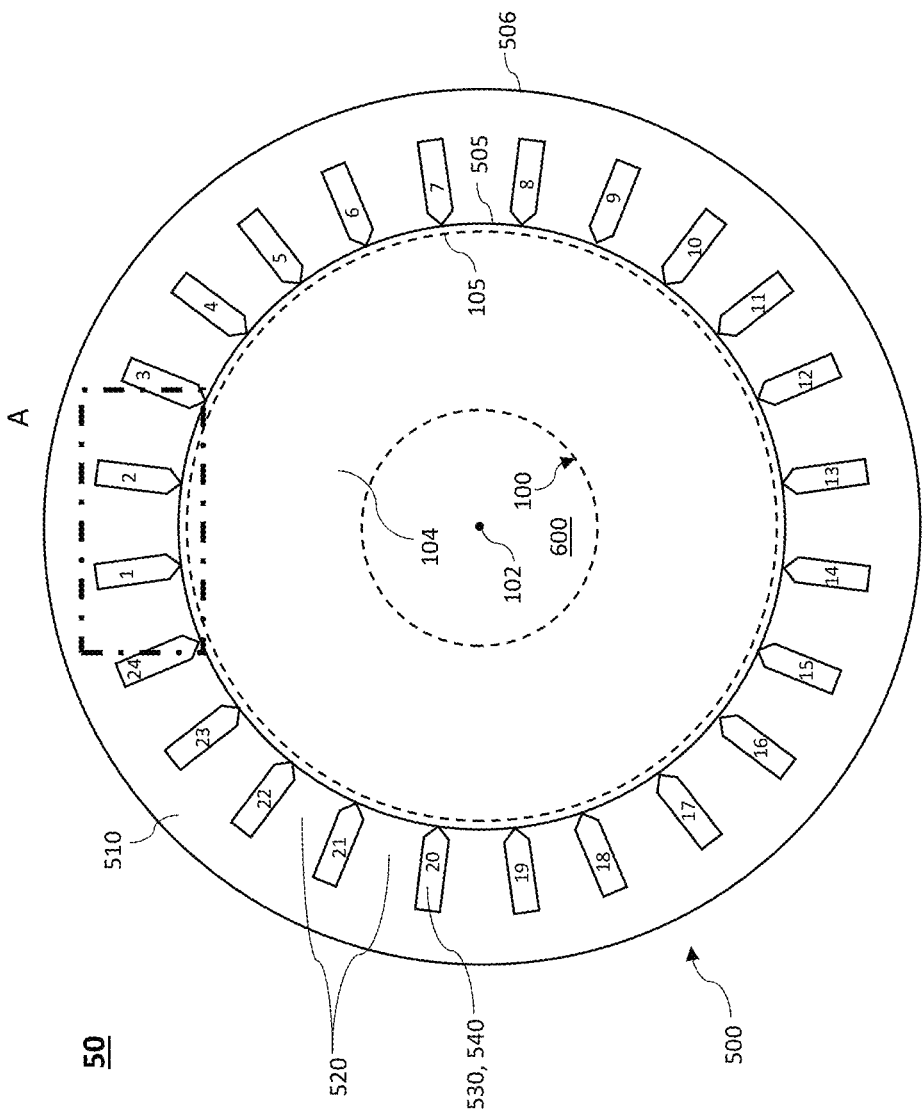
FIG. 1A is a horizontal cross-sectional view of a motor according to an exemplary embodiment of the present disclosure.
Figure 2:
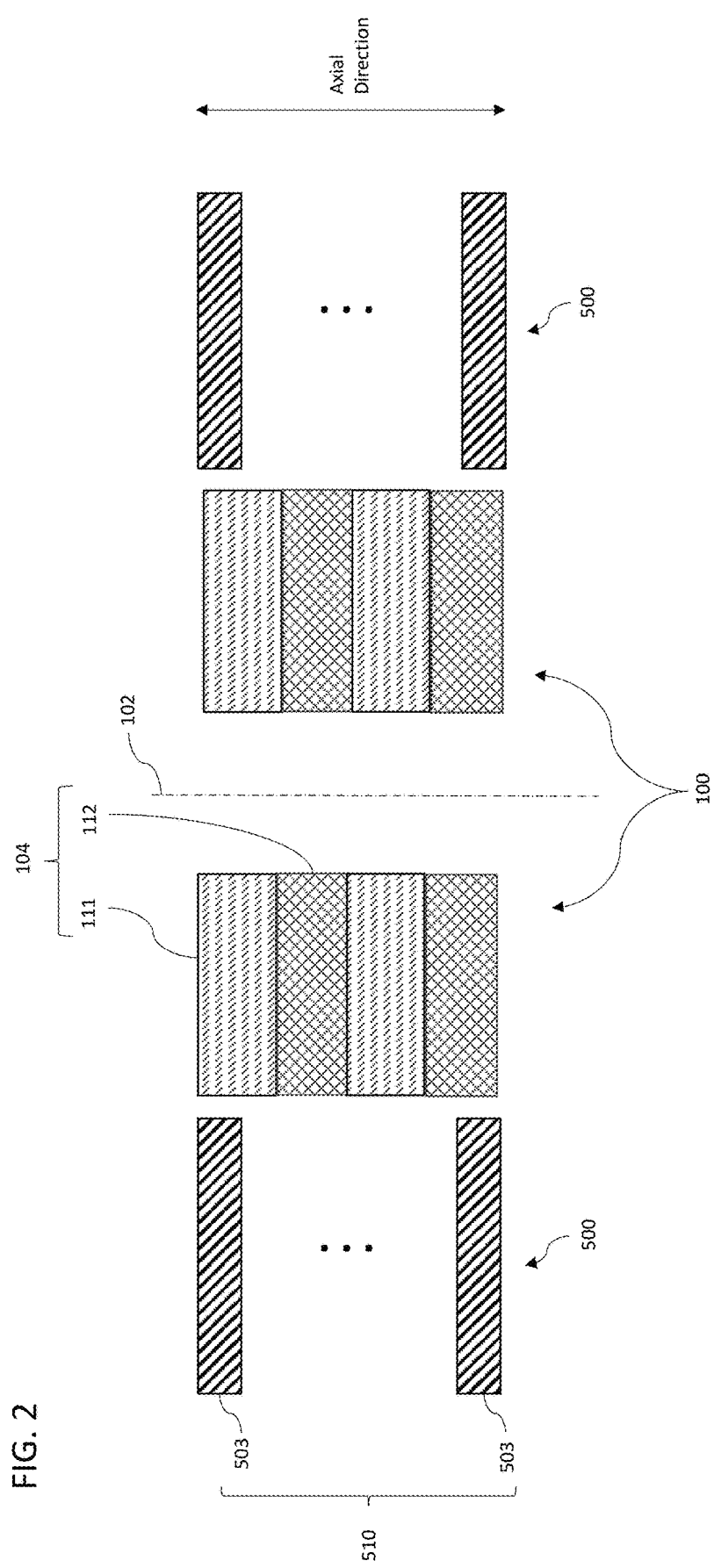
FIG. 2 is a vertical cross-sectional view of a motor according to an exemplary embodiment of the present disclosure.

FIG. 1A is a horizontal cross-sectional view of a motor and FIG. 2 is a vertical cross-sectional view of a motor according to an exemplary embodiment of the present disclosure.

A motor 50 includes a rotor assembly 100, a stator assembly 500, and a rotor shaft 600. The rotor assembly 100 is disposed for rotation within, and relatively to, the stator assembly 500. The rotor assembly 100 may be rotatably seated on or fixed to the rotor shaft 600. Alternatively, the rotor assembly 100 may be disposed outside the stator assembly 500 to define an exterior rotor motor. The rotor assembly 100 and the stator assembly 500 each may be disposed about and extend along a central axis 102. The rotor assembly 100 may be disposed concentric with the stator assembly 500.

The rotor assembly 100 may include the rotor core 104. For example, the rotor core 104 is disposed on the rotor shaft 600, and the outer surface 105 of the rotor core 104 may be spaced apart from an inner surface 505 of the stator core 510 by, for example, an air gap therebetween.

The rotor assembly 100 is configured to be rotatable about the central axis 102. As shown in FIG. 2, the rotor assembly 100 may be implemented as multiple rotor segments 111, 112 forming the rotor core 104. The multiple rotor segments 111, 112 are arranged in an axially stacked relationship. For example, the first rotor segment 111 and the second rotor segment 112 are stacked alternately along the central axis 102. The multiple rotor segments 111, 112 may be, for example, but not limited to, a permanent magnet rotor segment, a reluctance rotor segment, or combination thereof. As shown in FIG. 2, each of the first reluctance rotor segment 111 and the second reluctance rotor segment 112 may be formed as a single piece. Alternatively, the first reluctance rotor segment 111 and the second reluctance rotor segment 112 may be implemented as multiple laminations, respectively. Any number of segments and laminations in a given design may be used, depending on design choice.

The multiple rotor segments 111, 112 may be step-skewed from each other to reduce torque ripple and cogging torque, although not required. FIG. 2 illustrates four multiple rotor segments 111, 112, but the rotor assembly 100 may include two, six, eight or more rotor segments in other embodiments.

Figure 3B:
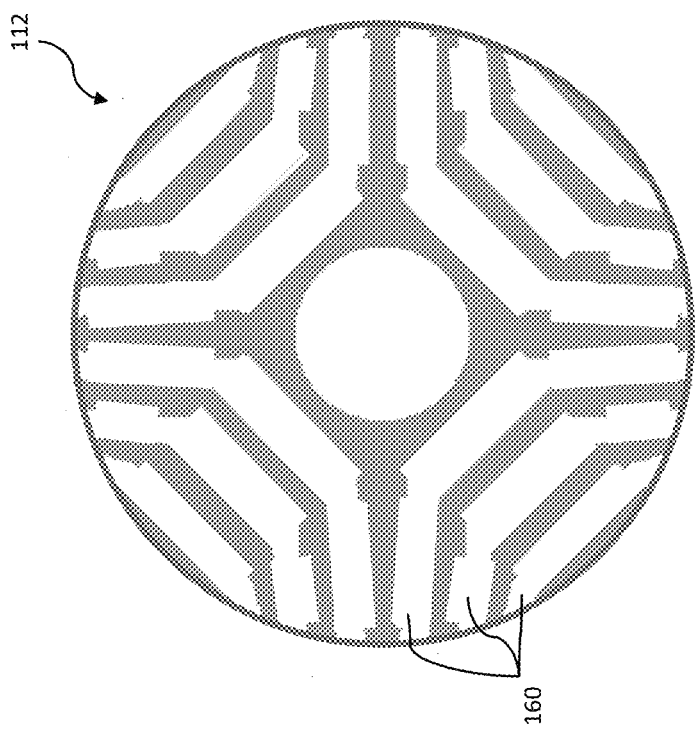
FIGS. 3A and 3B are cross-sectional views of rotor segments of a motor according to an embodiment of the present disclosure.
Figure 3A:
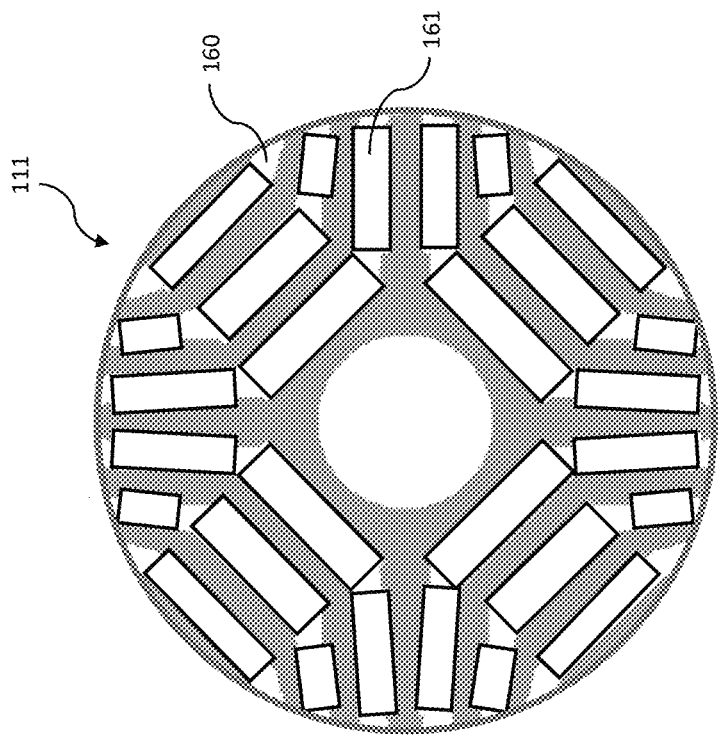

Referring to FIGS. 3A and 3B, in exemplary embodiments of the present disclosure, the first rotor segment 111 may be a reluctance rotor segment (e.g. a multi-barrier permanent magnet assist reluctance rotor segment) including permanent magnets while the second rotor segment 112 may be a reluctance rotor segment (e.g. a magnet free multi-barrier reluctance rotor) having no magnet.

The reluctance rotor segments 111, 112 operably associated with the stator assembly 500 may be configured to generate rotor torque through magnetic reluctance. The reluctance rotor segments 111, 112 may be constructed with flux barriers 160 to induce non-permanent magnetic poles by increasing the reluctance (i.e. the capability of opposing the magnetic flow passage) along some direction, favoring instead others (i.e. the paths more characterized by the presence of iron). The flux barrier 160 may have various configurations such as, for example, but not limited to, a V-type, a spoke-type, a bar-type, an I-type, any appropriate type, or combination thereof, although the flux barrier 160 can have any shape for a necessary operation of the motor 50. The flux barriers 160 may be an air gap. Non-magnetic material (e.g. nylon, epoxy, potting material or other filler material) could be positioned or injected into the flux barriers 160 to increase the mechanical strength of the reluctance rotor segments 111, 112. The second reluctance rotor segment 112 may not comprise any windings or permanent magnets.

However, one or more magnetic materials 161 may be disposed in the flux barrier 160 of the first reluctance rotor segment 111. The magnetic materials 161 may be, for example, but not limited to, a ferrite magnet. And, the magnetic materials 161 may not be rare-earth material such as Neodymium (Nd), Praseodymium Neodymium (PrNd), Dysprosium (Dy), Terbium (Tb), a rare earth permanent magnet (e.g. samarium cobalt (Sm—Co) magnet or neodymium iron boron (Nd—Fe—B) magnet) and so on. Further, neither the first reluctance rotor segment 111 nor the second reluctance rotor segment 112 may have no rare-earth material to reduce the manufacturing cost of the motor and avoid the risk of unstable supply of the rare-earth material while some exemplary embodiments of the present disclosure can provide similar or better performance as well as smaller packing size than a motor with a rare-earth material based design.

The first reluctance rotor segment 111 (or the second reluctance rotor segment 112) can provide reverse ripple against the torque ripple generated by the second reluctance rotor segment 112 (or the first reluctance rotor segment 111) in order to effectively cancel the cogging torque generated by the second reluctance rotor segment 112 (or the first reluctance rotor segment 111).

The reluctance rotor segments 111, 112 may be a synchronous reluctance type rotor. The synchronous reluctance type rotor is configured to rotate by a toque generated due to the inequality of permeance (or magnetic conductivities) by quadrature and direct axes of the rotor. The synchronous reluctance type rotor may have poles with an equal number of stator poles. The synchronous reluctance type rotor may operate at synchronous speeds without current-conducting parts. However, the reluctance rotor segment 111, 112 may be implemented as various types, for example, but not limited to, variable reluctance rotor, switched reluctance rotor, variable stepping reluctance rotor, and any appropriate reluctance type rotor.

Referring back to FIG. 1A, the stator assembly 500 includes a stator core 510 (e.g. iron core). The stator core 510 may be generally cylindrical in shape and extends along the central axis 102. The stator core 510 may include a substantially circular outer surface. As shown in FIG. 2, the stator assembly 500 may be implemented as multiple stator laminations 503 forming the stator core 510. The multiple stator laminations 503 are arranged in an axially stacked relationship. For example, the multiple stator laminations 503 are stacked along the central axis 102. Any number of laminations in a given design may be used, depending on design choice.

The inner surface 505 of the stator core 510 may be formed by a plurality of stator teeth 520. The stator teeth 520 may be arranged circumferentially and may protrude toward the rotor assembly 100. The inner surface 505 of the stator core 510 may form a cavity within the stator assembly 500 that is configured to receive the rotor assembly 500.

The stator slots 530 may be formed in the stator core 510 of the stator assembly 500. The stator core 510 defines stator slots 530 (e.g. 1 to 24) circumferentially arranged and extending outwardly from the inner surface 505 of the stator core 510 and lengthwise along the central axis 102. The stator slots 530 may be defined by the adjacent pair of stator teeth 520 that form the respective slot. The stator slots 530 may be evenly spaced from each other radially around the circumferential of the stator core 510. The stator slots 530 may be formed in parallel to each other. The stator assembly 500 may include any number of slots or poles suitable to the application at hand. In the exemplary embodiment illustrated in FIG. 1A, the stator core 510 defines twenty four (24) slots and has four (4) poles, but the stator core 510 may include more or fewer slots and/or poles in other embodiments. FIG. 1A shows stator slot numbers 1 through 24.

Figure 1B:
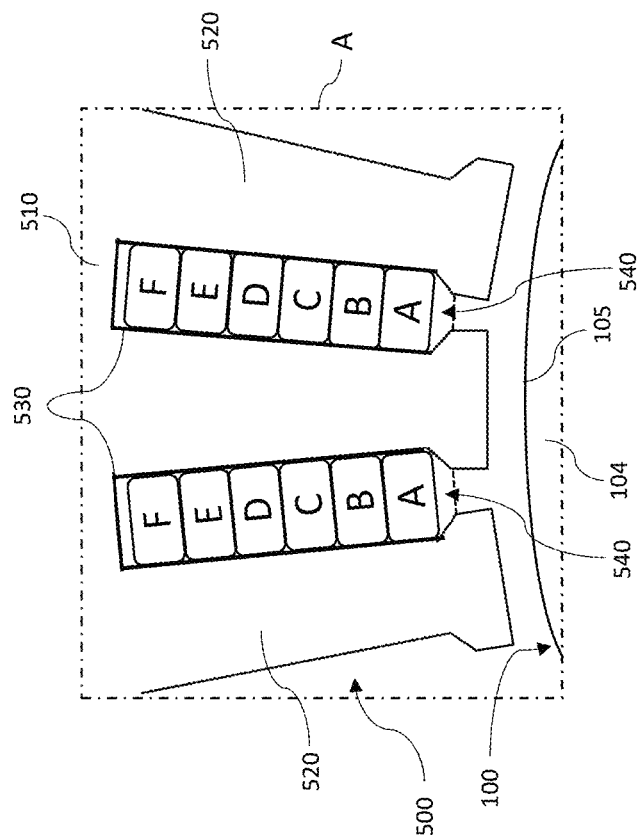
FIG. 1B is a partial enlarged view of a stator assembly taken from a portion A in FIG. 1A.

As shown in FIG. 1B, each of the plurality of stator slots 530 may define multiple slot layers, such as first, second third, fourth, fifth and sixth slot layers A, B, C, D, E and F. Each stator slot 530 has six sequential layers in a one-by-six linear arrangement. The slot layers are sequentially numbered from A to F from the inner surface 505 towards the outer surface 506 of the stator core 510. The first slot layer A is closest to the inner surface 505 of the stator core 510 and the sixth slot layer F is farthest from the inner surface 505 of the stator core 510. However, it should be appreciated that each stator slot 530 may include a different number and arrangement of layers, including but not limited to, four layers, eight layers, two-by-four layers, or four-by-four layers.

The stator slots 530 may be designed and dimensioned to receive electrical conductors 540. The conductors 540 may be placed in the stator slots 530 to form electromagnetic windings. For example, the conductors 540 may extend in the axial direction through the stator slots 1 to 24 or be disposed about (e.g., wound or slid about) the teeth 520 of the stator core 510. The stator slots 1 to 24 may have partially open slots such that small openings to the stator slots 520 are provided along the inner surface 505 of the stator core 510. Alternatively, the stator slots 530 may be closed slots. A winding arrangement for the conductors 540 can carry an excitation current. Current flowing through the conductors 540 generates a stator electromagnetic flux. The stator flux may be controlled by adjusting the magnitude and frequency of the current flowing through the conductors 540.

The conductor 540 of the stator assembly 500 may comprise a plurality of winding segments 400. The conductor winding segments 400 are bent into U-shapes, V-shapes, or any bent shape. These types of conductors are typically referred to a "hairpin" by those skilled in art because of their shapes and will be referred to as such in this description. The example of the hairpin-type winding segment 400 is illustrated in FIG. 4.

Figure 4:
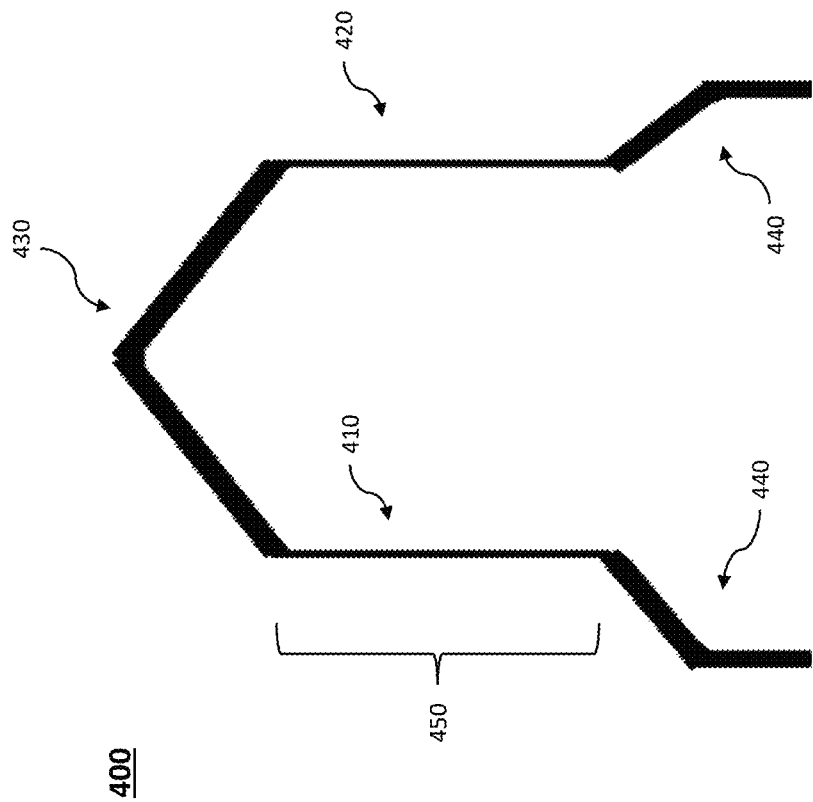
FIG. 4 is a conceptual view of schematically illustrating a hairpin winding segment according to an embodiment of the present disclosure.

Referring to FIG. 4, the hairpin winding segment 400 includes a first leg 410, a second leg 420, and an endturn portion (or a crown) 430 between the first and second legs 410, 420. The endturn portion 430 can have a substantially U-shaped, V-shaped, or curved-shaped configuration, although, in some embodiments, the endturn portion 430 can have a wave shape, a regular or irregular polygonal shape, and other shapes. The first and second legs 410, 420 may be substantially parallel to each other. The hairpin winding segment 400 is formed of electrically conductive material, and is configured to allow a current to flow from the first leg 410 to the second leg 420, or vice versa. The hairpin winding segment 400 is electrically isolated from the stator core 510 to prevent phase to ground shorts and electrically isolated from one another to prevent phase to phase shorts from occurring. The hairpin winding segments 400 may be arranged in groups of hairpin winding assemblies that are inserted into select stator slots 530 of the stator core 510. The hairpin winding segments 400 are installed in the stator core 510 by inserting the legs 410, 420 through corresponding ones of the stator slots 530.

Each of the first and second legs 410, 420 has an in-slot portion 450 is inserted into, and, disposed in one of stator slots 1 to 24 as one of first to sixth slot layers A to F. Each stator slot 1 to 24 is sized to receive one or more in-slot portions 450 of the first and second legs 410, 420 of the hairpin winding segments 400. The first leg 410 is inserted into one of stator slots 1 to 24 as one of first to sixth slot layers A to F, and the second leg 420 is inserted into another of stator slots 1 to 24 as one of first to sixth slot layers A to F.

Figure 5:
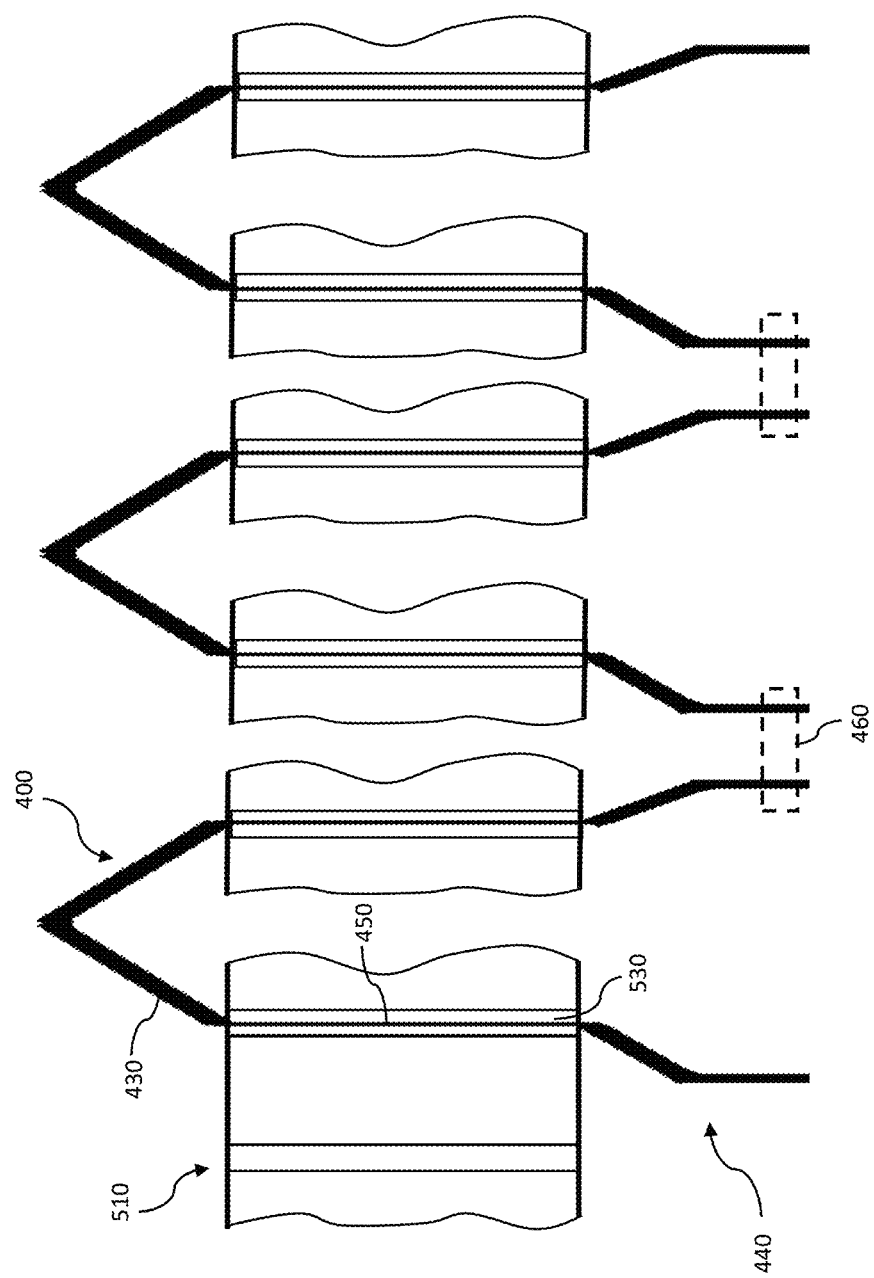
FIG. 5 is a partial side view of a stator assembly from an inside of a stator core according to an embodiment of the present disclosure.

As illustrated in FIG. 5, all of the hairpin winding segments 400 may be installed from the same end of the stator core 510 so that all endturn portions (or crowns) 430 of the hairpin winding segments 400 are located on one end of the stator core 510 and all open end portion 440 of the hairpin winding segment 400 are located on the other end of the stator core 510. As shown in FIG. 5, two open end portions 430 of one hairpin winding segment 400 are bent away from each other to connect with other hairpin winding segments 400. One open end portion 440 of one hairpin winding segment 400 is coupled to another open end portion 440 of another hairpin winding segment 400. For example, the open end portions 430 of corresponding hairpin winding segments 400 are joined or connected by a connection 460 such as a weld, a jumper connection (for instance, 300 of FIGS. 6A and 6B), a connection line or any type of connections, or form twists that connect with the twists of other hairpin winding segments 400. Each path includes associated hairpin winding segments 400 that are connected at the open end portions 440 to form a continuous conductor between a terminal (e.g. a terminal connected to an inverter) and a neutral point or connection.

The endturn portion 430 formed between the first and second legs 410, 420 of the hairpin winding segment 400 or the open end portions 430 of the first and second legs 410, 420 of the hairpin winding segment 400 may be exposed to an outside of the stator core 510, and the in-slot portion 540 of the first and second legs 410, 420 of the hairpin winding segment 400 may be disposed inside one of the stator slots 530 of the stator core 510.

A thickness of the endturn portion 430 (and/or the open end portion 440) of the hairpin winding segment 400 may be different from a thickness of the in-slot portion 450 of the first and second legs 410, 420 disposed in the stator slot 530 in order to reduce the overall resistance of the stator windings.

The resistance of the endturn portion 430 (and/or the open end portion 440) of the hairpin winding segment 400 may contribute to the overall resistance of the stator windings, and may deteriorate the thermal and speed performances of the motor 50, especially for low voltage applications. Therefore, according to some embodiments of the present disclosure, as illustrated in FIG. 4, the endturn portion 440 of the hairpin winding segment 400 may be thicker than the in-slot portion 450 of the first and second legs 410, 420 disposed within the stator slot 530. And, according to certain embodiments of the present disclosure, the open end portion 440 of the first and second legs 410, 420 may be thicker than the in-slot portion 450 of the first and second legs 410, 420 disposed within the stator slot 530. For example, a diameter, thickness, or cross-sectional area of the endturn portion 430 and/or the open end portion 440 of the first and second legs 410, 420 is greater than a diameter, thickness, or cross-sectional area of the in-slot portion 450 of the first and second legs 410, 420. By having thicker endturn portion 430 of the hairpin winding segment 400 (and/or thicker open end portion 440 of the first and second legs 410, 420) than the in-slot portion 450 of the first and second legs 410, 420, the overall resistance of the hairpin winding segment 400 can be reduced or minimized, thereby improving the terminal and speed performances of the motor 50.

Alternatively, the endturn portion 440 (and/or the open end portion 440) of the hairpin winding segment 400 may be thinner than the in-slot portion 450 of the first and second legs 410, 420 disposed within the stator slot 530 in order to reduce the overall resistance of the stator windings by having thicker in-slot portion 450 of the hairpin winding segment 400.

The first and second legs 410, 420 may have a substantially cylindrical shape, or at least a portion of the hairpin winding segment 400 can have a substantially rectangular cross-section. In some embodiments, at least a portion of the hairpin winding segment 400 may have other cross-sectional shapes, such as substantially circular, square, hemispherical, regular or irregular polygonal, etc.

Figure 6A:
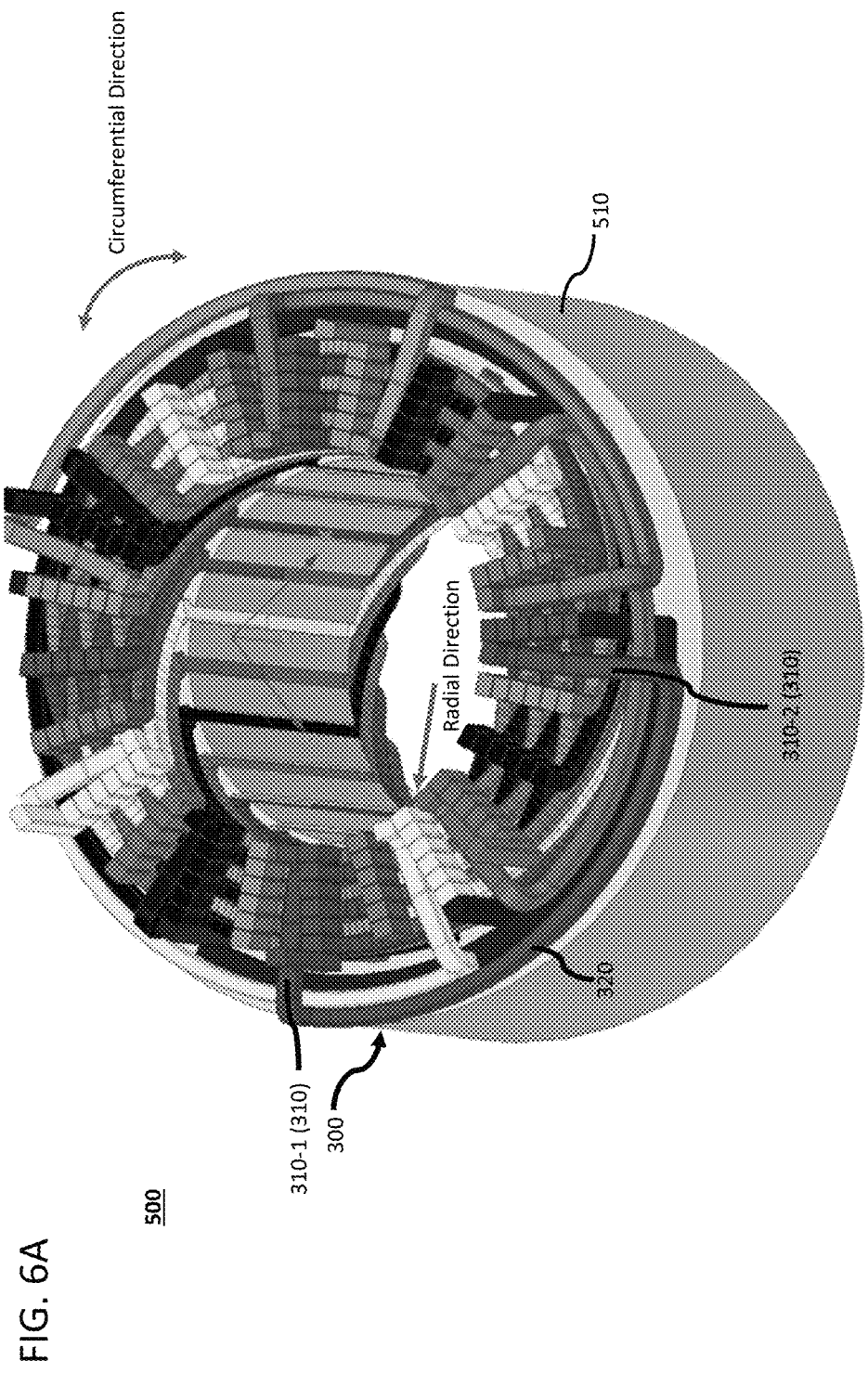
FIG. 6A is a perspective view of a stator assembly according to an embodiment of the present disclosure.
Figure 6B:
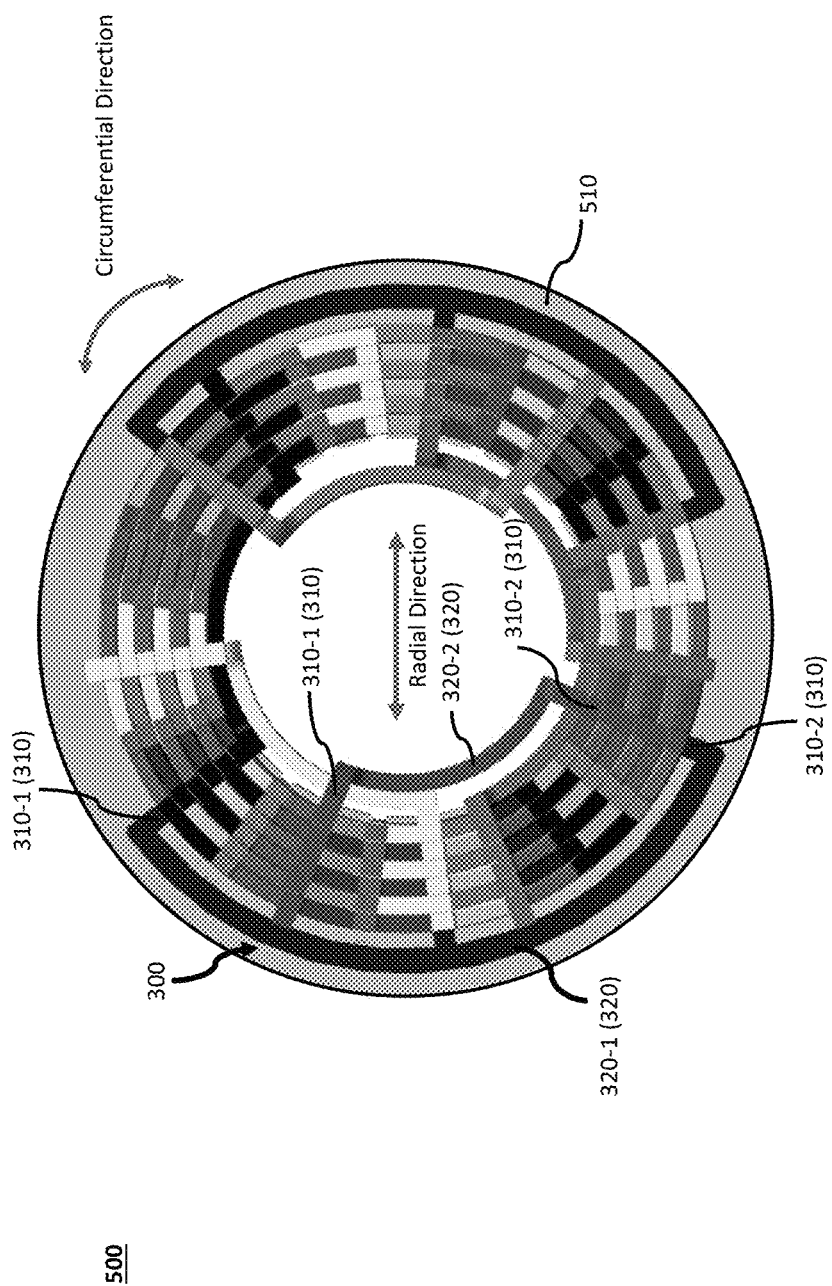
FIG. 6B is a bottom view of a stator assembly according to an embodiment of the present disclosure.

Referring to FIGS. 6A and 6B, the plurality of jumper connections 300 may be included in the stator assembly 500. The jumper connection 300 may connect between two or more of the hairpin winding segments 400. For example, the jumper connection 500 may be coupled to the end portions 440 of two or more of the hairpin winding segments 400 to electrically connect between two or more of the hairpin winding segments 400.

The jumper connection 300 may have one or more radial connection lines 310 and a circumferential connection line 320.

The radial connection line 310 may extend in a radial direction of the stator core 510 to pass through one or more conductor columns. The radial connection lines 310 are coupled to the hairpin winding segments 400. For example, a first radial connection line 310-1 may be coupled to one or more end portions 440 of one or more hairpin winding segments 400, a the second radial connection line 310-2 may be coupled to one or more other end portions 440 of one or more other hairpin winding segments 400. These structures and arrangements of the radial connection lines 310 can reduce the packaging size of the motor 50, specially an axial height of the package of the motor 50.

The circumferential connection line 320 may extend in a circumferential direction of the stator core 510. The circumferential connection lines 320 may be distributed either or both of an inside or/and an outside of an assembly of the conductors 540, for instance, but not limited to, an inner space or/and an outer space of the state core 510. For example, as illustrated in FIGS. 6A and 6B, an outer circumferential connection line 320-1 is arranged outside an assembly of the conductors 540 or adjacent to an outer edge of the state core 510, and an inner circumferential connection line 320-2 is arranged inside an assembly of the conductors 540 or adjacent to an inner edge of the state core 510. The circumferential connection line 320 connects between the first radial connection line 310-1 and the second radial connection line 310-2. These structures and arrangements of the circumferential connection lines 320 can reduce the axial extension or length of an assembly of the conductors 540 and minimize the packaging size of the motor 50, specially a length of the package of the motor 50.

Figure 7A:
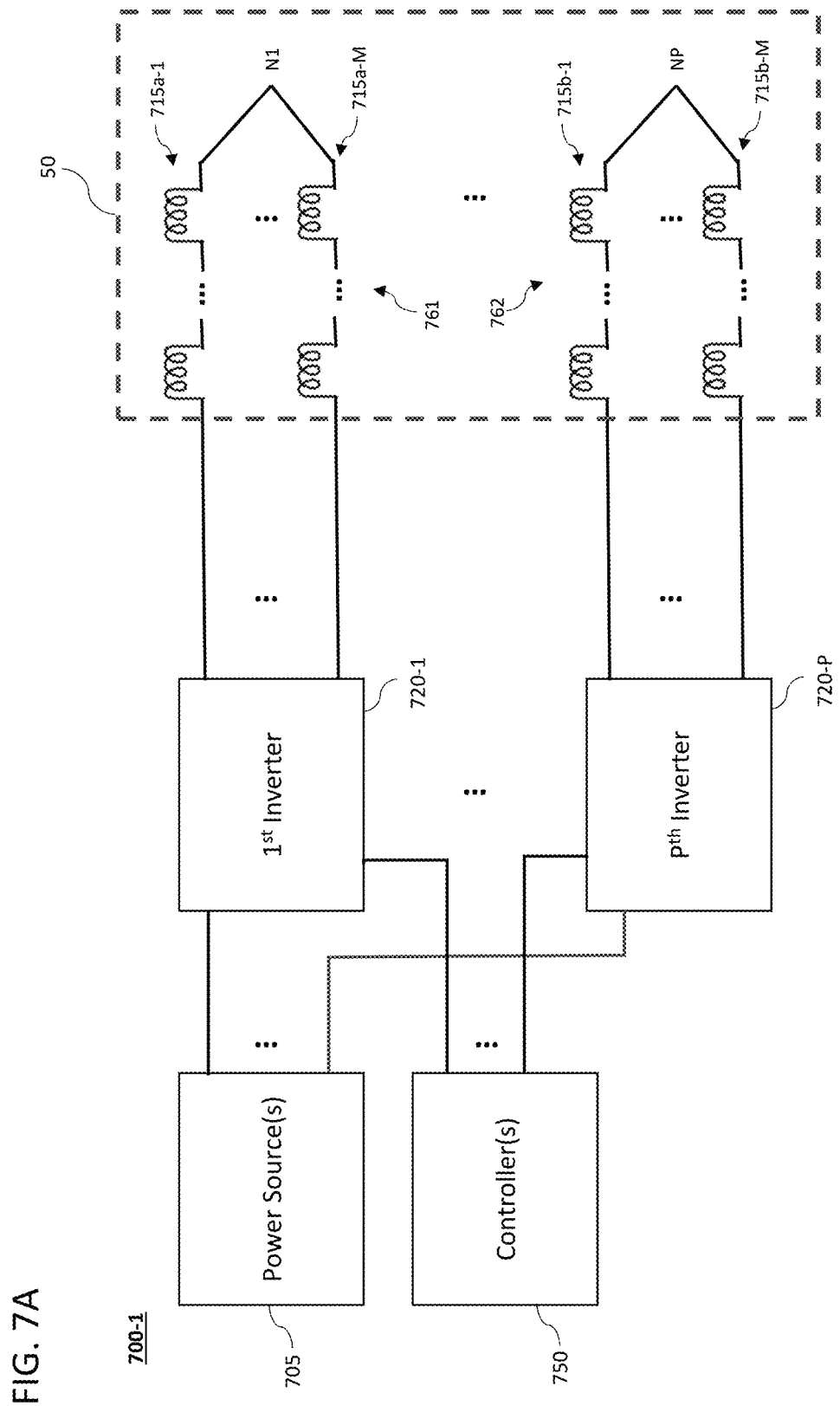
FIG. 7A is a schematic diagram of a motor assembly system configured for dual multi-phase according to some embodiments of the present disclosure.
Figure 7B:
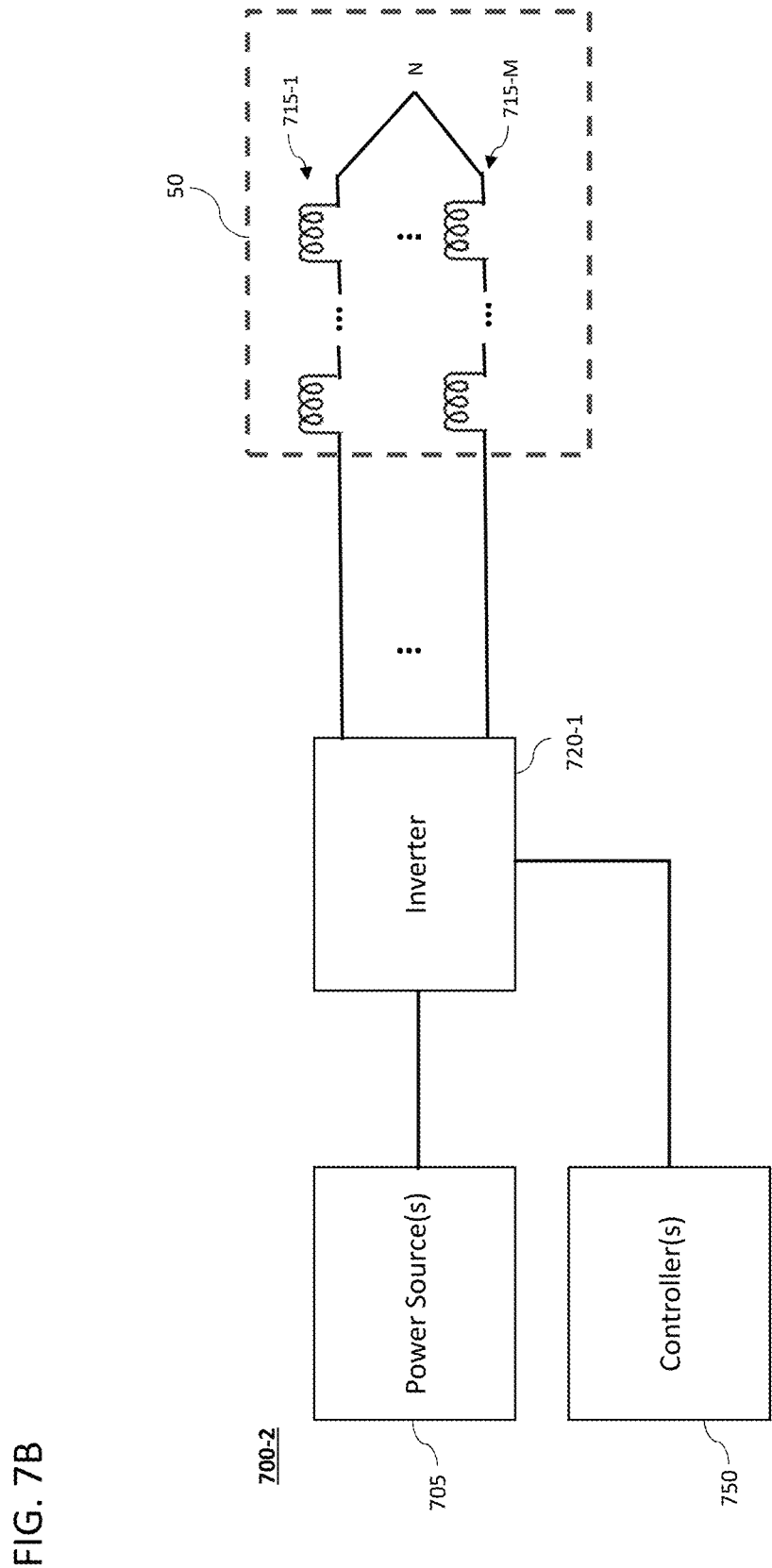
FIG. 7B is a schematic diagram of a motor assembly system configured for single multi-phase according to certain embodiments of the present disclosure.

FIG. 7A is a schematic diagram of a motor assembly system configured for dual multi-phase according to some embodiments of the present disclosure, and FIG. 7B is a schematic diagram of a motor assembly system configured for single multi-phase according to certain embodiments of the present disclosure.

One or more power sources 705 are configured to supply power to one or more inverters 720-1 to 720-P (P is a positive integer). The power source 705 may be a direct current (DC) source. For example, the power source 705 may be a battery. However, single and multi-phase alternating current (AC) outputs may be also possible.

The motor assembly system may be, for example, but not limited to, a double multi-phase type motor (e.g. FIG. 7A) or a single multi-phase type motor (e.g. FIG. 7B). The double multi-phase type motor of FIG. 7A comprises a first group of first motor windings 715a-1 to 715a-M and a second group of second motor winding 715b-1 to 715b-M (M is a positive integer more than 1). The single multi-phase type motor of FIG. 7B comprises a plurality of motor windings 715-1 to 715-M (M is a positive integer more than 1). In these exemplary embodiments, the motor 50 may be a three-phase permanent magnet motor having a U-phase winding 715a-1, 715b-1, 715-1, a V-phase winding 715a-2, 715b-2, 715-2, and a W-phase winding 715a-3, 715b-3, 715-3 and the hairpin winding segments 400 are arranged in the U-phase winding, the V-phase winding, and the W-phase winding which are connected to parallel to each other, but it should be appreciated that embodiments of the present disclosure should not be limited to such. One having ordinary skill in the art would understand that the present disclosure can be implemented with a two-phase motor or a more than three-phase motor.

One or more inverters 720-1 to 720-P (P is a positive integer, is two (2) for dual multi-phase configuration and is one (1) for single multi-phase configuration) receive power from one or more power sources 705, and convert DC voltages provided from the power source(s) 705 to AC voltages. The outputs generated by the inverter(s) 720-1 to 720-P are applied to the motor windings 715 to drive the multi-phase (M-phase) motor 50.

One or more controllers 750 are configured to control the inverter(s) 720-1 to 720-P. For example, one or more controllers 750 generate gate signals for the inverter(s) 720-1 to 720-P. Accordingly, control of the motor 50 is performed by regulating the voltage or the flow of current from the inverter(s) 720-1 to 720-P through the windings 715 of the motor 50. There are many control schemes that can be used. The controller(s) 750 may have, for example, but not limited to, one or more of a circuit, microprocessor or computer, which monitors and physically alters the operating conditions of the motor assembly system. The controllers 750 may also be configured to accept input and output from a wide array of input and output devices for receiving or sending values.

Firstly, the motor assembly system 700-1 of FIG. 7A can be configured for dual multi-phase configuration. Under the dual multi-phase configuration, the motor assembly system 700-1 comprises the first inverter 720-1 and the second inverter 720-2. A first group 761 of the hairpin winding segments 400 is connected to the first inverter 720-1 and a first neutral point N1, and a second group 762 of the hairpin winding segments 400 is connected to the second inverter 720-2 and a second neutral point N2.

Figure 8:
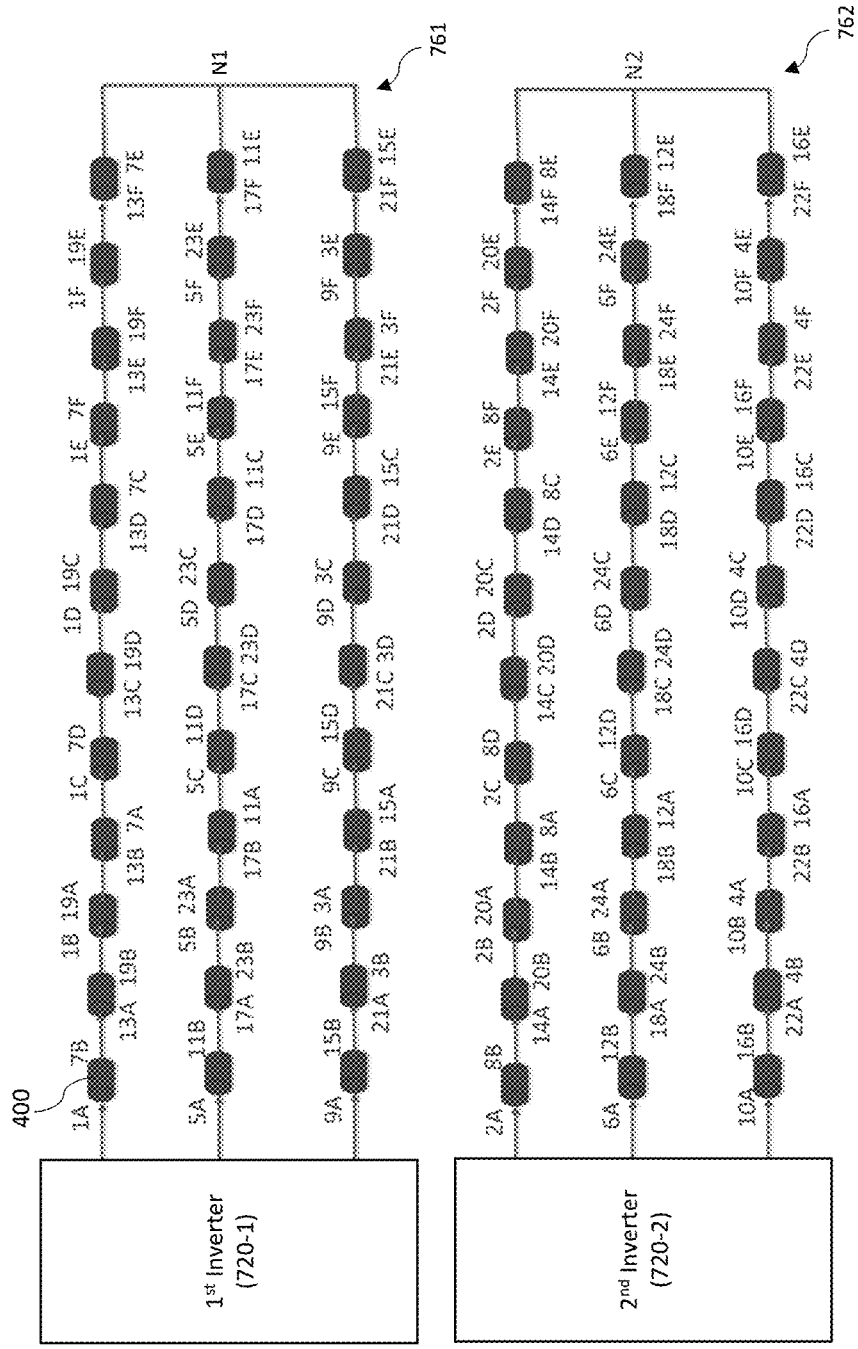
FIG. 8 is a conceptual diagram for schematically illustrating connection and arrangement of hairpin winding segments for dual multi-phase configuration according to an embodiment of the present disclosure.

In a first exemplary embodiment of dual multi-phase configuration, hairpin winding segments 400 inserted in one of two adjacently positioned stator slots 530 and hairpin winding segments 400 inserted in the other of two adjacently positioned stator slots 530 are connected to the first inverter 720-1 and the second inverter 720-2, respectively. For example, the first stator slot 1 and the second stator slot 2 are adjacently positioned to each other, and hairpin winding segments 400 inserted in the first stator slot 1 are connected to the first inverter 720-1 and hairpin winding segments 400 inserted in the second stator slot 2 are connected to the second inverter 720-2. In other words, first hairpin winding segments 400 inserted in odd-numbered stator slots 1, 3, . . . , 21, 23 are connected to the first inverter 720-1, and second hairpin winding segments 400 inserted in even-numbered stator slots 2, 4, . . . , 22, 24 are connected to the second inverter 720-2. FIG. 8 is a conceptual diagram for schematically illustrating connection and arrangement of hairpin winding segments 400 connected between the first and second inverters 720-1, 720-2 and motor neutral points N1, N2. Numbers 1 to 24 in FIG. 8 are a stator slot number, represented in FIG. 1A, and characters A to F in FIG. 8 indicate a layer position in a stator slot, represented in FIG. 1B. In FIG. 8, the number and character positioned left of the hairpin winding segment 400 is a go slot and the number and character positioned right of the hairpin winding segment 400 is a return slot. For example, the first leg 410 of the hairpin winding 400 is inserted in the stator slot and layer indicated by the number and character positioned left of the hairpin winding segment 400 in FIG. 8, and the second leg 420 of the hairpin winding segment 400 is inserted in the stator slot and layer indicated by the number and character positioned right of the hairpin winding segment 400 in FIG. 8. The phase shift of the current between the first and second inverters 720-1 and 720-2 may be between 0° and 45° to increase motor torque and reduce torque ripple.

In a second exemplary embodiment of dual multi-phase configuration, hairpin winding segments 400 inserted in a half of the stator slots 530, consecutively positioned, and hairpin winding segments inserted in the other half of the stator slots 530, consecutively positioned, are connected to first inverter 720-1 and the second inverter 720-2, respectively. For instance, the stator slots 530 are grouped into a first group of stator slots 1 to 12, which is a half of the stator slots 530 consecutively positioned, and a second group of stator slots 13 to 24, which is the other half of the stator slots 530 consecutively positioned. First hairpin winding segments 400 inserted in the first group of stator slots 1 to 12 are connected to the first inverter 720-1 and second hairpin winding segments 400 inserted in the second group of stator slots 12 to 24 are connected to the second inverter 720-2. Currents for both the first and second inverters 720-1 and 720-2 may be in phase.

Figure 9:
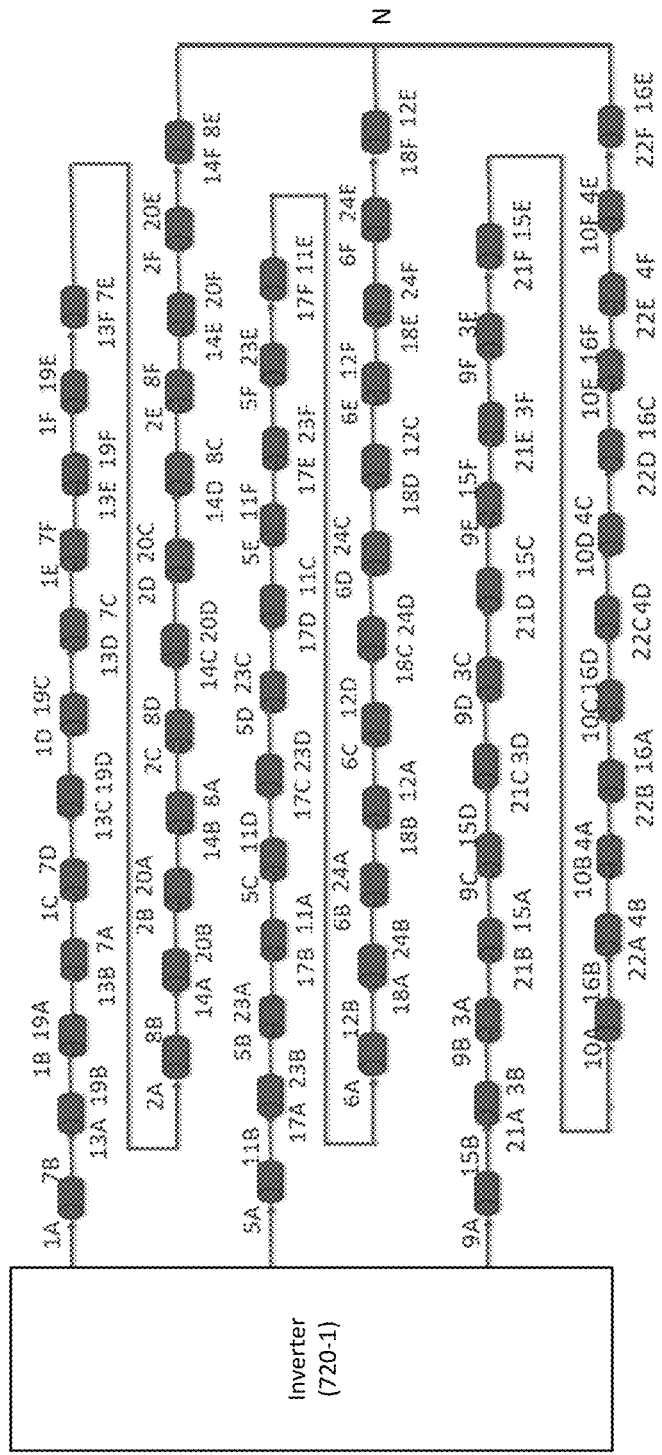
FIG. 9 is a conceptual diagram for schematically illustrating connection and arrangement of hairpin winding segments for single multi-phase configuration according to another embodiment of the present disclosure.

Secondly, the motor assembly system 700-2 of FIG. 7B can be configured for single multi-phase configuration. Under the single multi-phase configuration, the motor assembly system 700-2 comprises one inverter 720-1, and the hairpin winding segments 400 are connected to the inverter 720-1. In an exemplary embodiment of single multi-phase configuration, hairpin winding segments 400 inserted in one of two adjacently positioned stator slots 530 and hairpin winding segments 400 inserted in the other of the two adjacently positioned stator slots 530 are connected in series to each other. For example, the first stator slot 1 and the second stator slot 2 are adjacently positioned to each other and hairpin winding segments 400 inserted in the first stator slot 1 and hairpin winding segments 400 inserted in the second stator slot 2 are connected in series to each other, the fifth stator slot 5 and the sixth stator slot 6 are adjacently positioned to each other and hairpin winding segments 400 inserted in the fifth stator slot 5 and hairpin winding segments 400 inserted in the sixth stator slot 6 are connected in series to each other, and the ninth stator slot 9 and the tenth stator slot 10 are adjacently positioned to each other and hairpin winding segments 400 inserted in the ninth stator slot 9 and hairpin winding segments 400 inserted in the tenth stator slot 10 are connected in series to each other. FIG. 9 is a conceptual diagram for schematically illustrating connection and arrangement of hairpin winding segments 400 connected between the inverter 720-1 and a motor neutral point N. Numbers 1 to 24 in FIG. 9 are a stator slot number, represented in FIG. 1A, and characters A to F in FIG. 9 indicate a layer position in a stator slot, represented in FIG. 1B. In FIG. 9, the number and character positioned left of the hairpin winding segment 400 is a go slot and the number and character positioned right of the hairpin winding segment 400 is a return slot. For example, the first leg 410 of the hairpin winding segment 400 is inserted in the stator slot and layer indicated by the number and character positioned left of the hairpin winding segment 400 in FIG. 9, and the second leg 420 of the hairpin winding segment 400 is inserted in the stator slot and layer indicated by the number and character positioned right of the hairpin winding 400 in FIG. 9.

According to some embodiments of the present disclosure, the motor 50 having the hairpin winding segments 400 described above can reduce the packaging size by 25% in comparison with a shed winding type motor and by 16% in comparison with a motor with a rare earth material based design.

The motor 50 without using any rare earth material in the rotor core according to certain embodiments of the present disclosure can reduce battery current consumption and improve efficiency with comparison to a shed winding type motor, and can show similar or higher performance than the motor with the rare earth material based design. Further, the motor 50 according to some embodiments of the present disclosure can meet high-speed requirement points even without any rare earth material, and therefore the manufacturing cost can be reduced.

By having the hairpin type windings allowing to use thicker conductors in the stator of the motor according to certain embodiments of the present disclosure, the fill factor can be increased to around 85-90% while the maximum fill factor that can be achieved by the shed winding type motor may be around 75%, the overall resistance of the motor windings may be reduced, and the torque density and thermal performance of the motor may be improved. Further, the higher torque density can cause to reduce the packaging size of the motor assembly system so that the packaging size of the motor according to some embodiments of the present disclosure can be smaller than the motor with the rare earth material based design.

Figure 10:
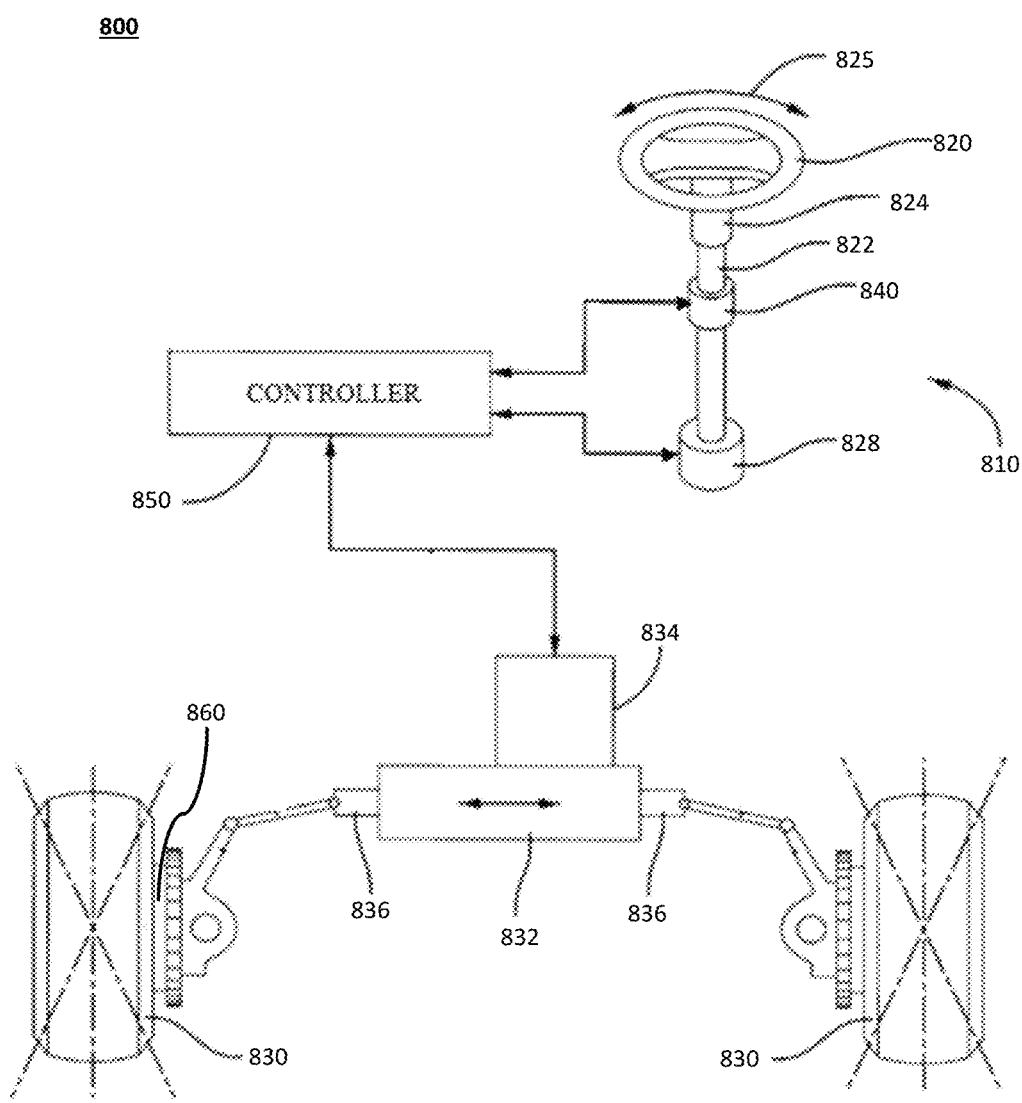
FIG. 10 is a schematic view of a vehicle including a steering system and a brake assembly according to an exemplary embodiment of the present disclosure.

The motor 50 according to certain exemplary embodiments of the present disclosure may be employed in a vehicle 800. The vehicle 800 may be any passenger or commercial automobile such as a hybrid vehicle, an electric vehicle, or any other type vehicles. FIG. 10 is a schematic view of a vehicle including a steering system and a brake assembly according to an exemplary embodiment of the present disclosure. The vehicle 800 may include a steering system 810 for use in a vehicle. The steering system 810 can allow a driver or operator of the vehicle 800 to control the direction of the vehicle 800 or road wheels 830 of the vehicle 800 through the manipulation of a steering wheel 820. The steering wheel 820 is operatively coupled to a steering shaft (or steering column) 822. The steering wheel 820 may be directly or indirectly connected with the steering shaft 822. For example, the steering wheel 820 may be connected to the steering shaft 822 through a gear, a shaft, a belt and/or any connection means. The steering shaft 822 may be installed in a housing 824 such that the steering shaft 822 is rotatable within the housing 824.

The road wheels 830 may be connected to knuckles, which are in turn connected to tie rods. The tie rods are connected to a steering assembly 832. The steering assembly 832 may include a steering actuator motor 834 (e.g. the motor 50 described above) and steering rods 836. The steering rods 836 may be operatively coupled to the steering actuator motor 834 such that the steering actuator motor 834 is adapted to move the steering rods 836. The movement of the steering rods 836 controls the direction of the road wheels 830 through the knuckles and tie rods.

One or more sensors 840 may be configured to detect position, angular displacement or travel 825 of the steering shaft 822 or steering wheel 820, as well as detecting the torque of the angular displacement. The sensors 840 provide electric signals to a controller 850 indicative of the angular displacement and torque 825. The controller 850 sends and/or receives signals to/from the steering actuator motor 834 to actuate the steering actuator motor 834 in response to the angular displacement 825 of the steering wheel 820.

In the steer-by-wire steering system, the steering wheel 820 may be mechanically isolated from the road wheels 830. For example, the steer-by-wire system has no mechanical link connecting the steering wheel 825 from the road wheels 830. Accordingly, the steer-by wire steering system may comprise a feedback actuator or steering feel actuator 828 comprising an electric motor (e.g. the motor 50 described above) which is connected to the steering shaft or steering column 822. The feedback actuator or steering feel actuator 828 provides the driver or operator with the same "road feel" that the driver receives with a direct mechanical link.

Although the embodiment illustrated in FIG. 10 shows the vehicle having the steer-by-wire steering system, the motor 50 according to exemplary embodiments of the present disclosure can be used in a vehicle having a mechanical steering system. The mechanical steering system typically includes a mechanical linkage or a mechanical connection between the steering wheel 820 and the road wheels 830. In the mechanical steering system, the steering actuator motor 834 includes an electric motor (e.g. the motor 50 described above) to provide power to assist the movement of the road wheels 830 in response to the operation of the driver or a control signal of the controller 850.

Accordingly, the motor 50 according to some embodiment of the present disclosure can be used as the steering actuator motor 834 or can be included in the feedback actuator or steering feel actuator 828.

The motor 50 can be employed in an electromagnetic brake assembly 860. The electromagnetic brake assembly 860 is configured to cause the road wheel 830 to slow or stop motion using electromagnetic force to apply mechanical resistance or friction by using the torque generated by the motor 50.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A motor comprising:
   a stator assembly; and
   a rotor assembly configured to be rotatable relative to the stator assembly,
   wherein the stator assembly comprises:
     a stator core having stator slots; and
     electrical conductors at least partially disposed in the stator slots, the electrical conductors having a plurality of hairpin winding segments,
     each of the hairpin winding segments comprising:

first and second legs, each of the first and second legs having an in-slot portion disposed in one of the stator slots, and
an endturn portion formed between the first and second legs,
wherein a thickness of the endturn portion formed between the first and second legs of each of the hairpin winding segments is different from a thickness of the in-slot portion of the first and second legs of each of the hairpin winding segments, disposed in one of the stator slots.

2. The motor according to claim 1, further comprising a plurality of jumper connections, each of the jumper connections connecting between two or more of the hairpin winding segments.

3. The motor according to claim 2, wherein each of the jumper connections is coupled to end portions of the two or more of the hairpin winding segments.

4. The motor according to claim 2, wherein each of the jumper connections has:
radial connection lines extending in a radial direction of the stator core and coupled to the two or more of the hairpin winding segments, and
a circumferential connection line extending in a circumferential direction of the stator core and connecting between the radial connection lines.

5. The motor according to claim 4, wherein the circumferential connection line of each of the jumper connections is disposed adjacent to an outer edge of the stator core or outside an assembly of the conductors.

6. The motor according to claim 4, wherein the circumferential connection line of each of the jumper connections is disposed adjacent to an inner edge of the stator core or inside an assembly of the conductors.

7. The motor according to claim 1, wherein the endturn portion formed between the first and second legs of each of the hairpin winding segments is thicker than the in-slot portion of the first and second legs of each of the hairpin winding segments, disposed in one of the stator slots.

8. The motor according to claim 1, wherein the endturn portion formed between the first and second legs of each of the hairpin winding segments is thinner than the in-slot portion of the first and second legs of each of the hairpin winding segments, disposed in one of the stator slots.

9. The motor according to claim 1, wherein:
each of the hairpin winding segments further comprises open end portions formed at ends of the first and second legs, and
thicknesses of the open end portions formed at the ends of the first and second legs of each of the hairpin winding segments are different from the thickness of the in-slot portion of the first and second legs of each of the hairpin winding segments, disposed in one of the stator slots.

10. The motor according to claim 9, wherein the open end portions formed at the ends of the first and second legs of each of the hairpin winding segments are thicker than the in-slot portion of the first and second legs of each of the hairpin winding segments, disposed in one of the stator slots.

11. The motor according to claim 9, wherein the open end portions formed at the ends of the first and second legs of each of the hairpin winding segments are thinner than the in-slot portion of the first and second legs of each of the hairpin winding segments, disposed in one of the stator slots.

12. The motor according to claim 1, wherein:
the endturn portion formed between the first and second legs of each of the hairpin winding segments is exposed to an outside of the stator core, and
the in-slot portion of the first and second legs of each of the hairpin winding segments is disposed inside one of the stator slots of the stator core.

13. The motor according to claim 1, wherein first hairpin winding segments inserted in one of two adjacently positioned stator slots and second hairpin winding segments inserted in another of the two adjacently positioned stator slots are connected to first and second inverters, respectively.

14. The motor according to claim 1, wherein first hairpin winding segments inserted in a half of the stator slots, consecutively positioned, and second hairpin winding segments inserted in another half of the stator slots, consecutively positioned, are connected to first and second inverters, respectively.

15. The motor according to claim 1, wherein first hairpin winding segments inserted in one of two adjacently positioned stator slots and second hairpin winding segments inserted in another of the two adjacently positioned stator slots are connected in series to each other.

16. The motor according to claim 1, wherein the electrical conductors are configured for dual multi-phase, wherein first hairpin winding segments inserted in one of two adjacently positioned stator slots and second hairpin winding segments inserted in another of the two adjacently positioned stator slots are connected to first and second inverters, respectively.

17. The motor according to claim 1, wherein the electrical conductors are configured for dual multi-phase, wherein first hairpin winding segments inserted in a half of the stator slots, consecutively positioned, and second hairpin winding segments inserted in another half of the stator slots, consecutively positioned, are connected to first and second inverters, respectively.

18. The motor according to claim 1, wherein the electrical conductors are configured for single multi-phase, wherein first hairpin winding segments inserted in one of two adjacently positioned stator slots and second hairpin winding segments inserted in another of the two adjacently positioned stator slots are connected in series to each other.

19. The motor according to claim 1, wherein the rotor assembly comprises:
one or more first reluctance rotor segments comprising a plurality of flux barriers including permanent magnets, wherein the permanent magnets included in the flux barriers of the one or more first reluctance rotor segments comprise ferrite magnets; and
one or more second reluctance rotor segments comprising a plurality of flux barriers having no magnet, and
wherein the one or more first and second reluctance rotor segments do not include a rare earth material.

20. A vehicle comprising:
one or more road wheels configured to cause the vehicle to move;
a steering wheel configured to generate an input for controlling the one or more road wheels;
a brake assembly configured to operate a vehicle brake associated with the one or more road wheels; and
one or more motors operatively connected to one or more of the one or more road wheels, the steering wheel and the brake assembly, at least one of the motors comprising:

a stator assembly, and a rotor assembly configured to be rotatable relative to the stator assembly, wherein the stator assembly comprises a stator core having stator slots, and electrical conductors at least partially disposed in the stator slots, the electrical conductors having a plurality of hairpin winding segments, each of the hairpin winding segments comprising first and second legs, each of the first and second legs having an in-slot portion disposed in one of the stator slots, and an endturn portion formed between the first and second legs, and wherein a thickness of the endturn portion formed between the first and second legs of each of the hairpin winding segments is different from a thickness of the in-slot portion of the first and second legs of each of the hairpin winding segments, disposed in one of the stator slots.

\* \* \* \* \*